INVENTOR.
Walter J. Brown.

April 9, 1963  W. J. BROWN  3,085,170
ROTATIONAL SPEED SENSING MODULATOR
Filed Nov. 19, 1959  6 Sheets-Sheet 2

INVENTOR.
Walter V. Brown.

April 9, 1963 W. J. BROWN 3,085,170
ROTATIONAL SPEED SENSING MODULATOR
Filed Nov. 19, 1959 6 Sheets-Sheet 3

INVENTOR.
Walker J. Brown.

April 9, 1963   W. J. BROWN   3,085,170
ROTATIONAL SPEED SENSING MODULATOR
Filed Nov. 19, 1959   6 Sheets-Sheet 6

FIG. 13

INVENTOR.
Walter J. Brown,

United States Patent Office 3,085,170
Patented Apr. 9, 1963

3,085,170
ROTATIONAL SPEED SENSING MODULATOR
Walter J. Brown, 71 Gurley Road, Stamford, Conn.
Filed Nov. 19, 1959, Ser. No. 854,071
9 Claims. (Cl. 310—95)

This invention relates to speed sensing means and more particularly has reference to an electromagnetic, rotational speed sensing device or modulator.

Although rotational speed sensing devices which employ electromagnetic means for providing an output signal proportional to an input speed are well known in the art, there has been a need for such a device which would operate with highest accuracy and precision at low input speeds and would operate equally well at high speeds. Direct current generators, for instance, which operate satisfactorily at low speeds are not suitable for high speed operation due to the presence of electrical contact brushes.

Other devices well known in the prior art are of relatively complicated design and assembly, are difficult to manufacture and maintain and therefore, burdened with severe shortcomings.

The design disclosed hereafter provides a new and improved rotational speed sensing modulator of very simple and inexpensive construction which together with its circuit gives precise and smooth performance from very low speed to high speed, thus being usable over a wide range of speeds. Moreover, the construction of the modulator itself as well as of the circuit operating in conjunction therewith is extremely simple so as to be characterized by high reliability and low initial cost.

One of the objects of this invention is the provision of a new and novel rotational speed sensing modulator avoiding one or more of the limitations and disadvantages of prior art devices.

Another object of this invention is the provision of a speed sensing modulator which operates from very low speed to high speed yet maintains accuracy and linearity of the output signal over this extended speed range.

Another object of this invention is the provision of a speed sensing modulator which uses electromagnetic induction for modulating an applied direct current signal.

A further object of this invention is the provision of a speed sensing modulator which is characterized by extreme simplicity of construction and by the absence of electrical brushes.

A further object of this invention is the provision of an electrical speed sensing modulator which operates in conjunction with a relatively simple electrical circuit to provide an alternating current signal which is useful for the speed regulation of rotating equipment.

A further and other object of this invention is the provision of a speed sensing modulator and circuit which provides an electrical feedback signal useful for controlling the speed of electrical, mechanical, hydraulic or other energy generating devices.

A further and still other object of this invention is the provision of a speed sensing modulator which provides an output signal having twice the frequency of that of an alternating current generator operating at the same speed, thus yielding improved accuracy and performance at low speeds.

Other and still further objects of this invention will be apparent by reference to the following description and the accompanying drawings in which.

Figure 1:
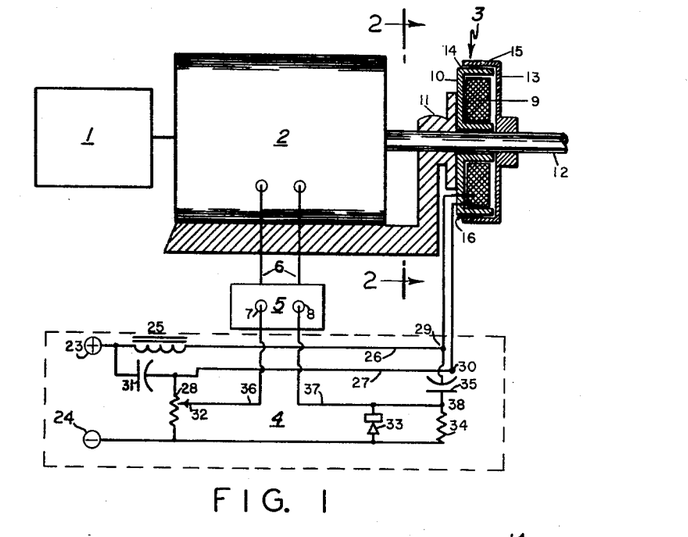
FIG. 1 shows one form of my speed-sensing modulator and speed regulating system.

FIG. 1 shows a complete speed regulating system comprising a power source 1, a variable speed drive 2, a device 3 which I call a speed-sensing modulator, a comparison network 4 and a speed-controlling transducer, converter or amplifier 5 connected through a control link 6 to the drive 2.

The variable speed drive 2 may comprise an eddy-current or a hysteresis or a magnetic particle clutch or other suitable variable speed transmission device such as a hydraulic drive, coupled to a rotating power source 1 such as an electric motor or a prime mover, for example an internal combustion engine or turbine. Alternatively the variable speed drive 2 may comprise an electric motor coupled to an electrical power source, and the speed-controlling amplifier may regulate the electrical power supplied to the motor armature or field.

Figure 2:
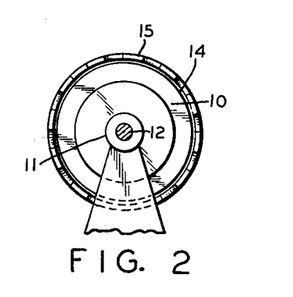
FIG. 2 is a view along lines 2—2 in FIG. 1.
Figure 3:
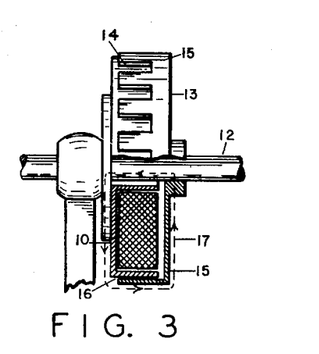
FIG. 3 is a part sectional view of the speed-sensing modulator of FIG. 1.
Figure 4:
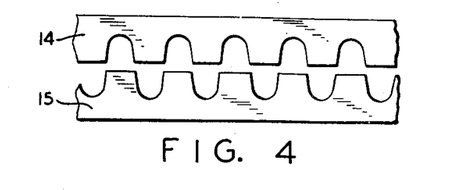
FIG. 4 is a developed view of a portion of the speed-sensing modulator of FIG. 1 for illustrating one of the important features of the modulator.

The speed-controlling transducer 5 may comprise an electrical, electronic, electromechanical or other control device or transducer arranged to influence the speed of the variable speed drive 2 in accordance with the voltage impressed across control terminals 7 and 8. The speed sensing modulator 3 in FIG. 1 comprises a stationary winding 9 of copper wire housed in a stationary magnetizable core or stator which is shown in the form of a cupped spider 10 of iron or other material having low residual magnetism; the spider 10 is attached to a bearing 11 which rotatably supports the shaft 12, the latter being driven by the variable speed drive 2. A rotatable magnetizable core or rotor made of magnetic material having low residual magnetism and shaped also in the form of a cupped spider 13 is mounted on the shaft 12 so as to rotate with the shaft. Each of the spiders 10 and 13 comprises a shallow cup having a cylindrical rim, 14 and 15 respectively, which is provided with equidistant notches or apertures as shown in FIGS. 2 and 3 and in developed form in FIG. 4, so as to exhibit a magnetically discontinuous portion on each spider. The spiders are so dimensioned and mounted as to provide a small airgap 16 between their discontinuous circumferential portions 14 and 15.

The comparison network 4 includes a source of direct current, not shown, which supplies direct current from positive terminal 23 through an impedance in the form of a choke coil 25, conductor 26 and terminal 29 to the modulator winding 9 and thence through terminal 30, conductor 27 and potentiometer 28 to the negative terminal 24.

When the shaft 12 is rotated, the notches in the discontinuous spider portion 15 are caused to traverse the notches in the discontinuous spider portion 14, thus creating variations in reluctance of the magnetic path which extends from shaft 12 radially outwards through spider 10 to its discontinuous portion 14, then axially and across the airgap 16 to the discontinuous portion 15 of spider 13, and thence radially inwards and then axially to the starting point as shown by the dotted arrow 17 in FIG. 3. When each aperture of the rotor 13 completely traverses an aperture of the stator 10, it will have produced a complete cycle of variation in reluctance of said magnetic path, in other words it will have caused the reluctance to increase and then to decrease to its original value. During each cycle of variation in magnetic reluctance, the inductance of the winding 9 will vary through a complete cycle and this in turn will produce a complete cycle of undulation in the current flowing through said winding. This undulation or modulation of the current flowing through the winding 9 creates a fluctuation of potential at the terminal 29 with respect to the potential at terminal 30. Accordingly, an alternating voltage is superimposed upon the direct current voltage appearing across the modulator terminals 29 and 30. A bypass condenser 31 is connected from terminal 30 to the positive direct current terminal 23 so as to provide a low impedance path for the current undulations.

Since a complete undulation or modulation cycle of current occurs during the traversal of one aperture of the rotor relative to a given point on the stator, a complete cycle of undulation is induced during the traversal of each aperture. Accordingly, the frequency of the undulating voltage component in cycles per second is equal to the number of apertures traversed per second. This is in direct contradistinction to an alternating current generator, in which the frequency in cycles per second of the generated alternating current is equal to only one half the number of slots traversed per second; this leads to an important operational advantage of my speed sensing modulator as compared with an alternating current tachometer generator, as will be explained later.

Figure 5:
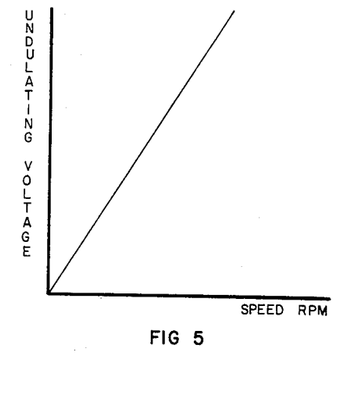
FIG. 5 is a graph of undulating voltage against speed of the modulator.
Figure 6:
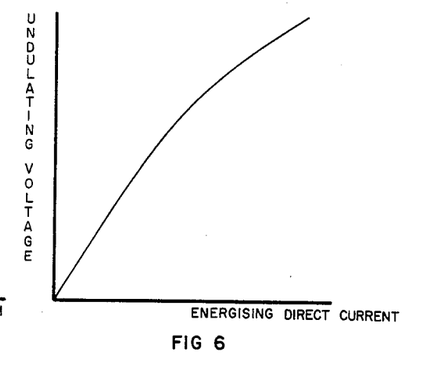
Fig. 6 is a graph of undulating voltage against the modulator energizing current.

In my speed sensing modulator, the inductance of winding 9 is varied by approximately the same amount, regardless of the speed of rotation, and it might therefore be expected that the magnitude of the undulations would be independent of speed. However, by connecting a choke 25 in series with the winding 9, I have found that the amplitude of the undulating voltage component which is developed across terminals 29 and 30 as a result of modulating the inductance value of winding 9 is directly proportional to the speed of rotation as shown in FIG. 5. Also, I have found that this undulating voltage component is substantially proportional to the energizing direct current flowing through the winding 9, subject to a slight saturation effect, as shown in FIG. 6, and that this alternating voltage component drops essentially to zero in the absence of direct current energization. For these various reasons the speed sensing device 3 is truly a modulator and not a generator of electrical power.

The comparison network 4 includes the potentiometer 28, having an adjustable slider 32 for the purpose of establishing a direct current reference voltage or command signal between slider 32 and negative terminal 24. The comparison network also includes a diode 33, a resistor 34, and a capacitor 35 for the purpose of establishing a unidirectional feedback voltage or signal across resistor 34 which is dependent upon the amplitude of the voltage undulations developed across the modulator terminals 29 and 30. The negative ends of resistor 34 and potentiometer 28 are connected together; the slider 32 of potentiometer 28 is connected through conductor 36, control terminals 7 and 8, and conductor 37 to the positive terminal 38 of resistor 34.

Thus the difference between the reference voltage signal and the feedback voltage signal is supplied as a difference signal, or actuating signal, to the input of transducer 5 through control terminals 7 and 8. This difference signal regulates the output speed of the drive 2 to develop an alternating voltage from the modulator winding 9 which, after rectification, is substantially equal to the reference signal.

The reference potentiometer 28 is connected in series with the modulator winding 9, and this has the advantage that the same current flows through both of them. The undulations of voltage in the modulator winding 9 are substantially proportional to the energizing direct current, as shown in FIG. 6, and also the reference voltage signal between the tap 32 and the lower end of potentiometer 28 is directly proportional to the same energizing direct current; accordingly the effect of any variations in the magnitude of the energizing direct current is cancelled out and it is unnecessary to regulate said direct current.

My speed sensing modulator has the important advantage that it develops an undulating voltage component which has twice the frequency of the alternating voltage which would be generated by a generator having the same number of slots as the instant modulator; in my modulator, a complete cycle of undulating voltage is developed during the motion of one slot pitch of the spider; on the other hand a generator having the same number of slots would only generate one half a cycle of alternating voltage during the same motion of one slot pitch. Since the output of the modulator is rectified at 33 and is then partially filtered by capacitor 35 and used as a feedback voltage, it follows that my modulator will give smoother filtered feedback and therefore smoother performance at a given slow speed of rotation than a generator having the same number of slots.

I have chosen to fabricate the stator spider 10 and the rotor spider 13 from a magnetic material having low residual magnetism or low remanence, so as to ensure that the output signal from the speed sensing modulator is substantially proportional to the energizing direct current, and to ensure that no appreciable alternating current or voltage is produced in the absence of such direct current; this is desirable, since any spurious alternating voltage or current which might otherwise be produced by residual magnetism would have only half the frequency of the desired undulations and if a considerable percentage component of the signal were at such half frequency it would impair the smoothness of operation at low speeds. This further emphasizes the fact that my device is essentially a modulator of direct current and not in any sense a generator of alternating current. For these reasons, the stator and rotor should be of a "soft" magnetic material of low remanence, such as the almost pure iron known in the trade as "Armco Ingot Iron."

Figure 7:
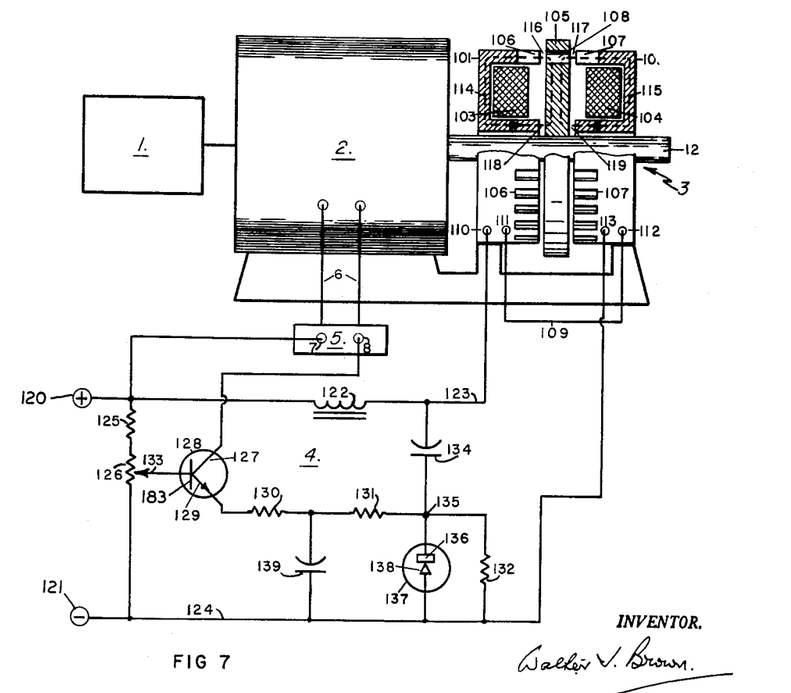
FIG. 7 is an elevational view showing another form of my speed sensing modulator and speed regulating system.

FIG. 7 shows a speed regulating system embodying an alternative design of speed-sensing modulator and a modified form of comparison network. Some of its parts have similar functions to those of FIG. 1 and are similarly numbered.

In FIG. 7, the speed sensing modulator 3 comprises a pair of stators 101 and 102, a winding consisting of a pair of similar coils 103 and 104, and a single rotor 105, all of which are shown in part section at the top and in side elevation at the bottom of FIG. 7. Each of the stators 101 and 102 comprises a cup of magnetizable material having low residual magnetism, and the rotor 105 comprises a thick disc of magnetizable material also having low residual magnetism. The stators 101 and 102 are provided with magnetically discontinuous portions 106 and 107 in the form of equally spaced circumferential notches or apertures around the outer rim of each cup. The rotor 105 is a disc provided with magnetic discontinuities 108 in the form of equally spaced holes or apertures arranged around an inner circumference in said disc. Preferably each of the two stators has the same number of apertures as the rotor. The two stators are mounted close on each side of the rotor with small airgaps 116 and 117 at their outer circumferences, and airgaps 118 and 119 at their inner circumferences.

Figure 8:
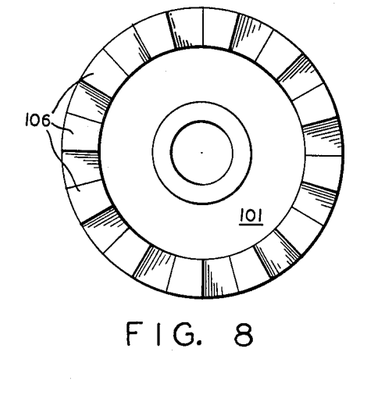
FIG. 8 is a plan view of part of the modulator of FIG. 7.
Figure 9:
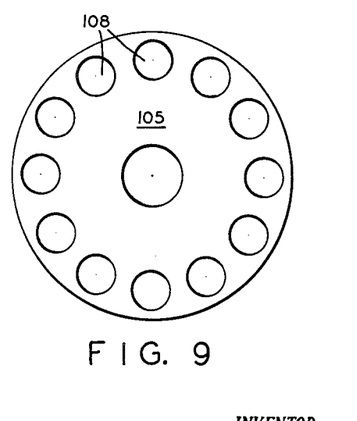
FIG. 9 is a plan view of another part of the modulator of FIG. 7.

FIG. 8 shows a front view of the stator 101, and FIG. 9 shows a front view of the rotor 105.

The two coils 103 and 104 are stationary multilayer solenoid coils mounted "back-to-back" within the cups 101 and 102 respectively, and they are electrically connected in series opposition by means of a conductor 109 which interconnects the "finish" terminal 111 of coil 103 with the "start" terminal 112 of coil 104. Direct current is supplied to the modulator coils, entering coil 103 at positive terminal 110 and leaving at terminal 111 thus creating a steady flux from left to right within the coil as shown by the dotted arrow 114; the current then enters coil 104 at terminal 112 and leaves at terminal 113 and, since the coils are arranged back-to-back this creates a steady flux from right to left within the coil, as shown by the dotted arrow 115. It will be seen that the flux denoted by arrow 114 is intercepted by the magnetic discontinuities comprising apertures 108 and 106; also the flux denoted by arrow 115 is intercepted by the magnetic discontinuities comprising apertures 108 and 107.

Accordingly, when the rotor 105 is rotated by shaft 12, the effective airgap is cyclically varied, thus simultaneously varying the reluctance of the two magnetic paths shown by the arrows 114 and 115. This in turn produces a cyclical variation of inductance of each of the coils 103 and 104 and therefore causes undulations in the direct current to occur at the same frequency as the frequency of traversal or scanning of a stator notch by the rotor apertures. The speed sensing modulator 3 of FIG. 7 has the advantage that its two similar coils 103 and 104 are arranged astatically, or back-to-back, so that any stray alternating magnetic flux which passes along the axis of both coils from an external source would induce equal and opposite voltages in coils 103 and 104 would therefore produce no spurious alternating voltage across the terminals 110 and 113. This same objective may be alternatively achieved by connecting said coils 103 and 104 in parallel opposition, by interconnecting terminal 110 with 112 and by interconnecting terminal 111 with 113, while still passing the direct current into terminal 110 and out of terminal 113.

Also, as in the speed sensing modulator of FIG. 1 the magnetic materials of the stators 101, 102 and of the rotor 105 have such a low residual magnetism or remanence that substantially no alternating current or voltage is generated upon rotating the rotor in the absence of direct current energization of the winding.

In FIG. 7, the notches 106 and 107 in stator cups 101 and 102 are shown in angular alignment with each other so that undulations in voltage are produced simultaneously in each coil 103 and 104 upon rotation of the rotor 105. Alternatively, however, the notches 106 and 107 may be arranged to be in staggered alignment with each other, so that undulations in voltage are produced alternately in each coil 103 and 104, thus doubling the frequency of the resultant total undulations; in this case it is preferable to make the holes 108 smaller than shown in FIG. 9 and to make the notches 106 wider than shown in FIG. 8.

In FIG. 7, the comparison network 4 includes a source of direct current, not shown, having a positive terminal 120 and a negative terminal 121. Direct current flows from terminal 120 through a choke coil 122 and conductor 123 to the modulator terminal 110 and thence through the modulator windings to terminal 113 and then through conductor 124 to terminal 121. Direct current also flows from terminal 120 through a dropping resistor 125 and a potentiometer 126 to terminal 121.

Additionally, direct current flows from terminal 120 to terminal 7, through transducer 5 to terminal 8 and thence to the collector 127 of transistor 128 and out from the transistor emitter 129, resistors 130, 131 and 132 and conductor 124 to terminal 121. A tapping 133 is provided on potentiometer 126 for the purpose of applying a direct current reference voltage to the base 183 of transistor 128, with respect to the negative terminal 121.

A capacitor 134 is connected through terminal 135 to the cathode 136 of a diode 137 and thence from the diode anode 138 to the conductor 124 so that the capacitor 134 and diode 137 are in series across the modulator terminals 110 and 112, and the resistor 132 is connected across the diode as shown.

Upon rotation of shaft 12 and rotor 105, undulations of direct current voltage are created in the modulator winding and are transmitted through capacitor 134 to the diode 137 and are rectified by the diode so as to develop a unidirectional voltage across resistor 132 and thus making terminal 135 positive with respect to terminal 121. This unidirectional voltage is filtered by resistor 131 and capacitor 139 and is applied through resistor 130 to the transistor emitter 129. This is in the nature of a feedback signal, which is a function of the speed of rotor 105 and which establishes a positive voltage at the transistor emitter 129 relative to the negative terminal 121.

Since a positive reference voltage is applied to the base 183 from potentiometer slider 133, collector current will flow from terminal 7 to 8 of transducer 5 and said transducer will bring up the speed of the output shaft 12 of the drive 2 to such a speed that the feedback signal voltage approximately equals the reference voltage, and will thereafter regulate the speed of shaft 12 so that it is substantially constant. The regulated speed may be adjusted at any time by varying the position of slider 133 so as to vary the direct current reference voltage.

Figure 10:
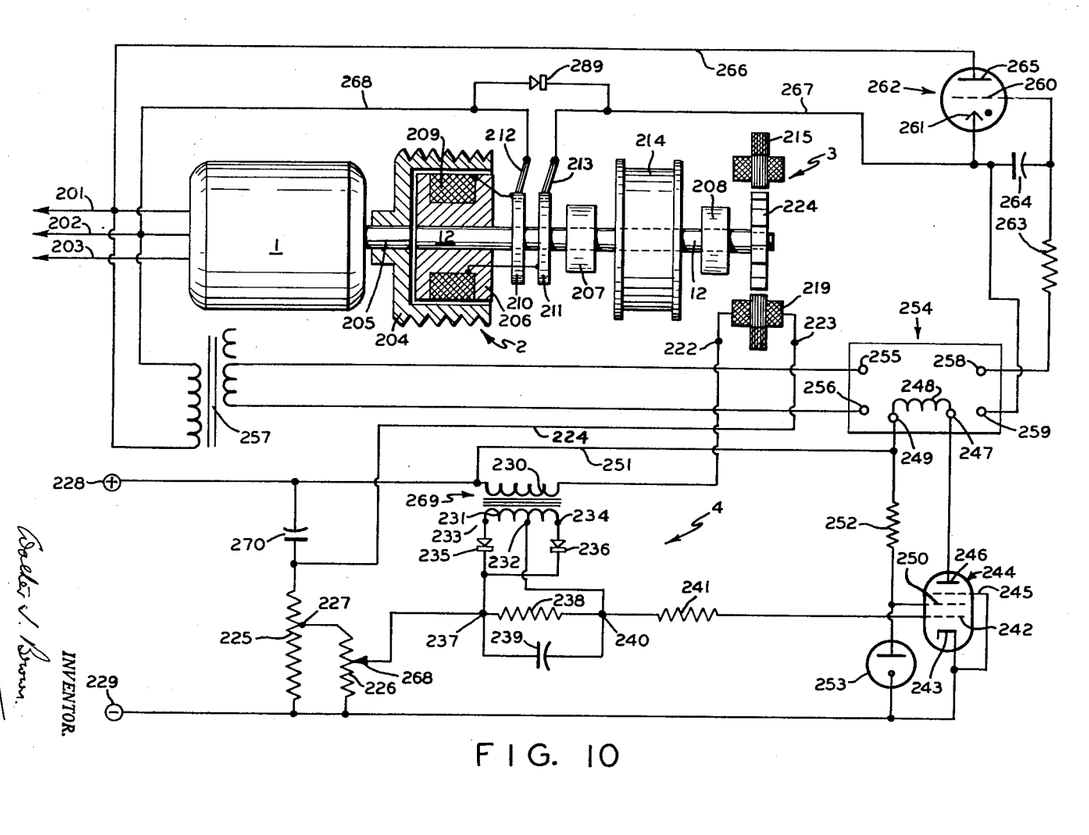
FIG. 10 shows a further alternative form of my speed sensing modulator and speed regulating system.

FIG. 10 shows an alternative arrangement including a power source 1 in the form of a three phase induction motor supplied by the three line conductors 201, 202 and 203. The variable speed drive 2 comprises an eddy-current or hysteresis clutch having an input member 204 in the form of a cylinder of suitable magnetic material driven directly from the motor 1 by shaft 205. The output member 206 comprises a spool-shaped magnetizable body mounted on the output shaft 12 which runs in bearings 207 and 208. A multilayer solenoid winding 209 is wound in the annular section of the spool 206 and is connected through slip rings 210 and 211 to brushes 212 and 213. A pulley 214 is mounted on shaft 12 for delivering power to an external load.

Figure 11:
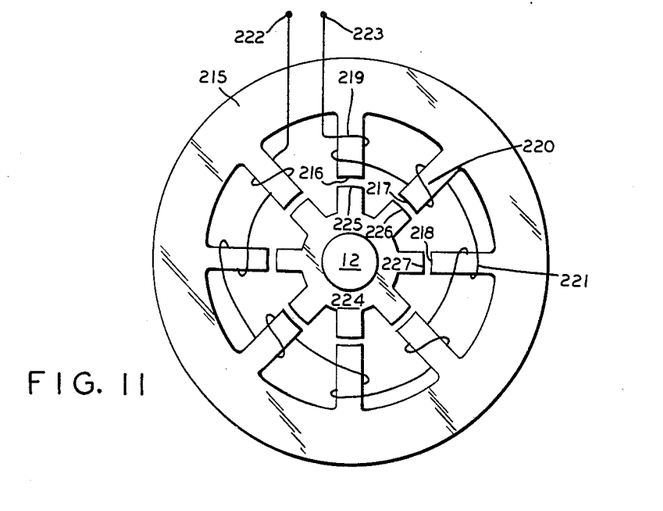
FIG. 11 is a view of part of the modulator of FIG. 10.

The speed sensing modulator 3 in FIG. 10 comprises a magnetizable stator 215 having a plurality of circumferentially disposed inwardly projecting protrusions such as 216, 217, 218 as shown in front elevation in FIG. 11. A winding is disposed around said protrusions, comprising a plurality of coils such as 219, 220 and 221, one on each said protrusion which are connected in series between terminals 222 and 223. Said coils are of alternate polarities, so that when they are energized by direct current through terminals 222 and 223 they establish a heteropolar magnetic field, with the alternate protrusions developing north and south magnetic poles respectively.

A toothed wheel 224 is mounted on shaft 12 and is provided with a number of teeth such as 225, 226 and 227 in FIG. 11, identical with the number of protrusions. Said toothed wheel is of magnetizable material, preferably having low residual magnetism or remanence such as Armco Ingot Iron, though I have found that an ordinary cast iron spur gear is satisfactory, providing it is machined to an outside diameter which will provide a small airgap of the order of .012 inch between its teeth and the stator protrusions. Alternatively the rotor, as well as the stator, may comprise a stack of laminations of electrical sheet steel, providing that the stator and rotor have an identical number of teeth, which provision however I have found it difficult to meet with any commercially available types of laminations; special laminations are required, unlike those of a generator for instance.

In FIG. 10, the comparison network 4 comprises a source of direct current, not shown, having a positive terminal 228 and a negative terminal 229. Direct current for energizing the modulator winding flows from terminal 228, through the primary 230 of transformer 269 to terminal 222, thence through the modulator winding to terminal 223, conductor 224 and through potential divider 225 to negative terminal 229. A potentiometer 226 is connected between a tapping point 227 on potential divider 225 and the negative terminal 229. The potentiometer 226 is provided with an adjustable slider 268 for supplying an adjustable positive reference voltage at slider 268 with respect to terminal 229.

The transformer 269 is provided with a secondary winding 231 having a center tap 232 and end terminals 233 and 234. Said end terminals 233, 234 are connected through diodes 235 and 236 respectively to a terminal 237 which is connected to slider 268. A high ohmic resistor 238 and a capacitor 239 are connected in parallel between terminal 237 and terminal 240 which is in turn connected to center tap 232. Accordingly, when the rotor 224 is revolving, the undulations in the direct current which are created in the winding of speed sensing modulator 3 are passed through transformer primary 230 and they induce an alternating voltage in secondary winding 231 which is rectified by the full wave pair of diodes 235, 236 and filtered by capacitor 239 to provide a direct current voltage across resistor 238 with a negative voltage appearing at terminal 240 in relation to the voltage at slider 268. Said negative voltage is accordingly subtracted from the positive reference voltage at slider 268 and the difference between said voltages is applied as negative bias, through limiting resistor 241, between the grid 242 and cathode 243 of a pentode tube 244. The pentode suppressor 245 is connected to the cathode 243 and its plate 246 is connected through the terminal 247, control winding 248 and terminal 249 of a sensitive phase shifting network 254 having the registered trademark "VecTroL," and thence through conductor 251 to the positive direct current supply terminal 228. The screen grid 250 of pentode 244 is supplied with direct current from conductor 251 through resistor 252 and the screen-to-cathode voltage is regulated by the glow-discharge tube 253.

The phase shifting network is provided with alternating current input terminals 255, 256 which are energized from the incoming alternating current power lines 201 and 202, through an isolating transformer 257, and the network delivers an alternating output voltage between terminals 258 and 259, the phase angle of which can be smoothly advanced in dependence upon the magnitude of the direct current in the control winding 248 and therefore in dependence upon the grid-to-cathode voltage of the pentode 244. The output terminals 258, 259 of the VecTroL phase shifting network are connected to the grid 260 and cathode 261 respectively, of a thyratron tube 262, through a transient-suppressing resistor 263 and in parallel with a transient-suppressing capacitor 264.

The thyratron anode 265 is connected through conductor 266 to the incoming alternating current power line 201. Its cathode 261 is connected through conductor 267, brush 213, slipring 211, clutch excitation winding 209, slipring 210, brush 212 and conductor 268 to the incoming power line 202. Accordingly, when a positive reference voltage is applied from potentiometer slider 268, the pentode grid 242 tends to be driven positive, thus driving considerable plate current through the VecTroL control winding 248 and fully advancing the phase angle of the thyratron grid voltage in relation to the thyratron anode voltage and supplying complete half cycles of alternating current to the clutch excitation coil 209 and developing maximum available torque at the clutch output shaft 12. When the shaft reaches the desired speed the rectified undulations in the speed modulator winding will develop sufficient negative voltage at terminal 240 to balance out the positive reference voltage and drive the pentode grid 242 negative to an extent at which the pentode plate current decreases sufficiently to retard the phase angle of the thyratron grid voltage, thus reducing the clutch excitation current sufficiently just to maintain the speed of the output shaft 12 and rotor 224 at the desired value, and to regulate the speed against changes of load or line voltage.

A back rectifier 289 is connected across the clutch excitation winding 209 so as to permit continuous current flow through this winding, which is usually highly inductive. Also, a capacitor 270 is connected across the direct current reference supply source 228, 229 and the potential divider 225, so as to permit the current undulations to pass as freely as possible from the modulator winding terminals 222, 223, to the transformer primary 230.

Figure 12:
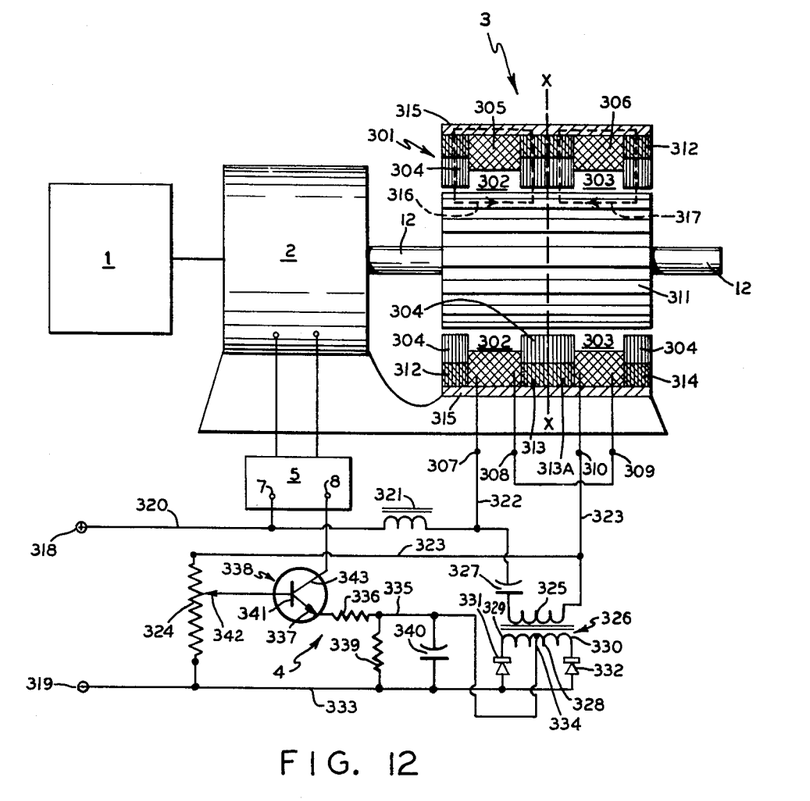
FIG. 12 is another form of my speed sensing modulator and speed regulating system.

FIG. 12 shows an alternative arrangement of the speed sensing modulator 3 and of the comparison network 4. The magnetizable stator of the speed sensing modulator has a plurality of circumferentially disposed, inwardly projecting, protrusions and is similar in front elevation to the stator 215 in FIG. 11. However, the stator 301 in the arrangement of FIG. 12 is provided with a pair of axially spaced, internal circumferential grooves 302 and 303 traversing its protrusions 304. A multilayer solenoid coil 305 is disposed in groove 302 and is brought out to a start terminal 307 and a finish terminal 308. A second similar coil 306 is disposed in groove 303 and is arranged in a back-to-back relationship with coil 305 and is brought out to a start terminal 309 and a finish terminal 310. A toothed wheel or drum 311 of magnetizable material is mounted on the shaft 12. It has a number of teeth identical with the number of protrusions in each stator section.

The stator may be machined from a "soft" magnetic material such as Armco Ingot Iron, or alternatively it may comprise three separate stacks of circular laminations 312, 313 and 314 of electrical sheet steel which are tightly mounted within a cylindrical shell 315 of soft magnetic material. When the stator coils are energized with direct current flowing from terminal 307 to 308 of coil 305, and thence from terminal 309 to 310 of coil 306, each coil establishes a separate homopolar magnetic flux path interlinking the coil as shown by arrows 316 and 317. When the toothed wheel rotor 311 is rotated by shaft 12, the reluctance of each of said magnetic paths is periodically varied by the rotor teeth and the stator protrusions, thus causing undulations in the direct current.

In the comparison network of FIG. 12, a direct current power source, not shown, is applied to positive terminal 318 and negative terminal 319. Direct current flows from terminal 318 through conductor 320, choke coil 321, conductor 322, terminal 307, coil 305, terminals 308 and 309, coil 306, terminal 310, conductor 323 and potentiometer 324 to negative terminal 319. The primary 325 of a transformer 326 is connected in series with a blocking capacitor 327 across the modulator winding terminals 307 and 310 and the direct current undulations accordingly create an alternating voltage across the transformer primary 325 which in turn induces an alternating voltage in the transformer secondary 328. The two ends 329 and 330 of said secondary are connected through diodes 331 and 332 respectively, to conductor 333 and thence to negative terminal 319.

The secondary 328 has a center tap 334 which is connected through conductor 335 and resistor 336 to the emitter 337 of a transistor 338; a resistor 339 and capacitor 340 are connected in parallel between conductors 335 and 333, and a rectified and filtered positive feedback voltage, which is dependent upon the rotor speed, is accordingly developed by the diodes 331 and 332 and this positive voltage is applied to the emitter 337 in relation to the negative terminal 319.

The collector 343 of transistor 338 is connected through the control terminals 8 and 7 of the transducer 5 to the positive terminal 318.

A positive reference voltage is also applied to the transistor base 341 from a tapping 342 on the potentiometer 324, and this causes collector current to flow through transducer 5, which in turn causes the variable speed drive 2 to run at such a speed that the feedback voltage at the emitter approximately equals the reference voltage at the base of transistor 338, and the speed is continuously regulated so as to be close to this value.

In FIG. 12, the protrusions in the three stator sections 312, 313 and 314 are normally in angular alignment with each other, so that undulations occur simultaneously in the direct current in coils 305 and 306. The reason for providing two coils and three stator sections is that the coils are astatically disposed so that any spurious voltages which might be induced in the two coils by stray magnetic fields would cancel out.

It will be readily apparent however that if the stray field is negligible, the modulator may be simplifed by omitting the entire half of the assembly which is to the right of the vertical broken line X—X and retaining only two stator sections 312 and 313, bisected by a single groove 302 containing a single coil 305 having its terminals 307 and 308 connected respectively to conductors 322 and 323.

Alternatively, the complete assembly of FIG. 12 may be retained, and the protrusions on the half of the stator sections (313A and 314) which are to the right of line X—X may be in staggered alignment with respect to the protrusions of the half of the stator sections 312 and 313 which are to the left of said line X—X. By then making the inward protrusions considerably narrower than those shown in FIG. 11, separate undulations of direct current will be alternately developed in each of the coils 305 and 306 and the total resultant of said undulations will have twice the frequency.

Figure 13:
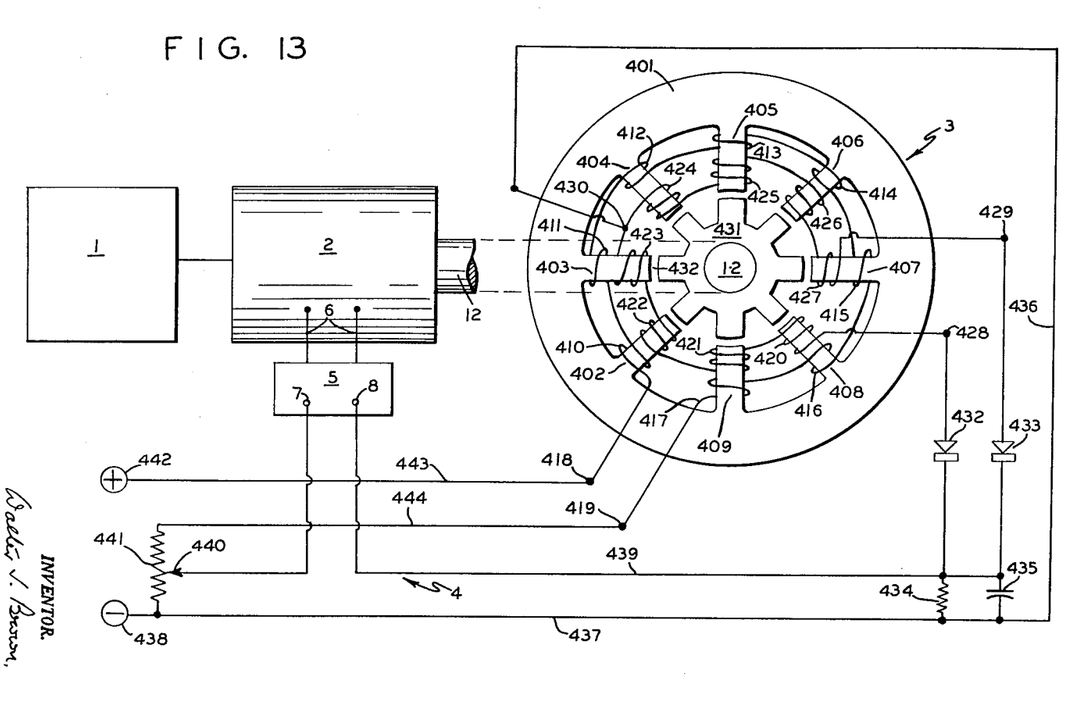
FIG. 13 shows a still further alternative form of my speed sensing modulator and speed regulating system.

FIG. 13 shows a further alternative arrangement of the speed sensing modulator 3 together with a simplified form of comparison network 4. For clarity, the power source 1 and variable speed drive 2 are shown in side elevation, and the speed sensing modulator 3 is shown considerably oversize and in front elevation, with its shaft 12 diagrammatically shown as coupling the drive 2 to the modulator 3.

The modulator stator 401 is of magnetizable material having circumferentially disposed inwardly projecting protrusions 402, 403, 404, 405, 406, 407, 408 and 409. A direct current winding is disposed around said protrusions, comprising a plurality of coils 410, 411, 412, 413, 414, 415, 416, and 417, one on each protrusion which are connected in series between terminals 418 and 419. The odd and even numbered coils are of opposite polarities so that when they are energized by direct current between terminals 418 and 419 the alternate protrusions develop north and south magnetic poles respectively. A secondary winding is also disposed around said protrusions, and it comprises a plurality of coils 420, 421, 422, 423, 424, 425, 426 and 427 connected in series between terminals 428 and 429 and having a center tap 430 at a point between coils 423 and 424. The odd and even numbered alternating current coils are also alternately polarized—for instance each alternating current coil may be of the same polarity as the direct current coil on the same protrusion.

A toothed wheel 431 is mounted on shaft 12 and has a number of teeth identical with the number of stator protrusions and is mounted within the stator with a small airgap 432 therebetween. Upon rotation of the toothed wheel 431 and when the direct current winding is energized through terminals 418 and 419, the reluctance of the magnetic paths which interlink the direct current winding is caused to vary, thus creating undulations in the direct current which manifest themselves as an alternating voltage which is induced in the alternating current winding between terminals 428 and 429. This alternating voltage is divided by the center tap at terminal 430 and its two halves are rectified by diodes 432 and 433 and the resulting unidirectional feedback signal is delivered to resistor 434 and filtered by capacitor 435; the lower ends of resistor 434 and capacitor 435 are connected by conductor 436 to center tap 430, and by conductor 437 to the negative terminal 438 of a direct current source which is not shown. Thus a positive direct current feedback signal voltage is developed at the upper end of resistor 434 and is transferred by conductor 439 to the control terminal 8 of transducer 5. A positive direct current reference signal is applied to the transducer control terminal 7 as follows: Direct current flows from the positive supply terminal 442 through conductor 443 to terminal 418, through the direct current modulator winding to terminal 419 and thence by conductor 444 to the top end of potentiometer 441, the lower end of which is connected to the negative supply terminal 438. A positive direct current reference signal is taken from the tap 440 on potentiometer 441. Thus, the direct current in the modulator winding, and therefore the feedback signal, is always proportional to the reference voltage, which is tapped off the potentiometer, and accordingly the speed is automatically regulated in accordance with the setting of potentiometer tap 440 and the speed is not appreciably affected by changes in the direct current supply voltage. The transducer control terminals 7 and 8 may be connected directly to the control winding of a VecTroL phase shifting network, or alternatively they may form the input terminals of a preamplifier, such as the grid and cathode of a pentode, or the base and emitter of a transistor, or the control winding of a magnetic amplifier.

When using a speed sensing modulator of the type described hereinabove, I have found it possible to obtain smooth speed regulation under varying load conditions at speeds down to 40 r.p.m. using a stator and rotor each having only thirty-six magnetic discontinuities.

While there have been described and illustrated certain embodiments and features of the present invention, it will be apparent to those skilled in the art that various other and further modifications may be made therein without deviating from the intent and scope of the foregoing invention which shall be limited only by the scope of the appended claims.

Features disclosed but not claimed herein are claimed in co-pending application of Walter J. Brown, Serial No. 854,472, filed November 20, 1959.

What is claimed is:

1. In a speed regulating system which includes a power source, a variable speed drive and a transducer, the combination of: a speed sensing modulator driven through said variable speed drive by said power source and said modulator providing a signal to said transducer whose output is connected to regulate the speed of said drive; said modulator including a magnetizable rotor driven by the output from said variable speed drive, and a magnetizable stator, each made of low remanence magnetic material and each being provided with a set of circumferential magnetic discontinuities which sets are spaced apart by a small airgap so as to establish a variable magnetic path through said stator, rotor and airgap; a winding interlinking said magnetic path; a direct current source connected to energize said winding; an inductive impedance coupled to said winding whereby upon rotation of said rotor by said variable speed drive undulations of direct current are produced in said winding and an alternating voltage is produced across said impedance; means rectifying said alternating voltage and comparing it against a reference signal, and the difference signal between said reference signal and rectified alternating voltage being connected as input signal to said transducer to produce a speed responsive output therefrom to said variable speed drive.

2. In a speed regulating system which includes a power source, a variable speed drive and a transducer, the combination of: a speed sensing modulator driven through said variable speed drive by said power source and said modulator providing a signal to said transducer whose output is connected to regulate the speed of said drive; said modulator including a magnetizable rotor driven by the output from said variable speed drive, and a magnetizable stator, each made of low remanence magnetic material and each being provided with a set of circumferential magnetic discontinuities which sets are spaced apart by a small airgap so as to establish a variable magnetic path through said stator, rotor and airgap; a winding interlinking said magnetic path; a potentiometer connected to said winding; a direct current source connected to serially energize said potentiometer and winding; an inductive impedance coupled to said winding whereby upon rotation of said rotor by said variable speed drive undulations of direct current are produced in said winding and an alternating voltage is produced across said impedance; means rectifying said alternating voltage and comparing it against a reference signal derived from said potentiometer, and the difference signal between said reference signal and rectified alternating voltage being connected as input signal to said transducer to produce a speed responsive output therefrom to said variable speed drive.

3. A speed regulating system as set forth in claim 2 wherein a capacitor is connected across the series combination of said potentiometer and direct current source.

4. In a speed regulating system which includes a power source, a variable speed drive and a transducer, the combination of: a speed sensing modulator driven through said variable speed drive by said power source and said modulator providing a signal to said transducer whose output is connected to regulate the speed of said drive; said modulator including a magnetizable rotor driven by the output from said variable speed drive, and a magnetizable stator, each made of low remanence magnetic material and each being provided with a set of circumferential magnetic discontinuities which sets are spaced apart by a small airgap so as to establish a variable magnetic path through said stator, rotor and airgap; a winding interlinking said magnetic path; a potentiometer connected to said winding; a direct current source connected to serially energize said potentiometer and winding thereby providing energization of said winding and a source of reference voltage which is proportional to the direct current flowing through the winding; an inductive impedance coupled to said winding whereby upon rotation of said rotor by said variable speed drive undulations of direct current are produced in said winding and an alternating voltage is produced across said impedance; means rectifying said alternating voltage and comparing it against the reference voltage, and the difference signal between said reference voltage and rectified alternating voltage being connected as input signal to said transducer to produce a speed responsive output therefrom to said variable speed drive.

5. In a speed regulating system which includes a power source, a variable speed drive and a transducer, the combination of: a speed sensing modulator driven through said variable speed drive by said power source and said modulator providing a signal to said transducer whose output is connected to regulate the speed of said drive; said modulator including a magnetizable rotor driven by the output from said variable speed drive, and a magnetizable stator, each made of low remanence magnetic material and each being provided with a set of circumferential magnetic discontinuities which sets are spaced apart by a small airgap so as to establish a variable magnetic path through said stator, rotor and airgap; a winding interlinking said magnetic path; a direct current source connected to energize said winding; a potentiometer connected across said direct current source for providing a reference signal, an inductive impedance coupled to said winding whereby upon rotation of said rotor by said variable speed drive undulations of direct current are produced in said winding and an alternating voltage is produced across said impedance; means rectifying said alternating voltage and comparing it against the reference signal, and the difference signal between said reference signal and rectified alternating voltage being connected as input signal to said transducer to produce a speed responsive output therefrom to said variable speed drive.

6. In a speed regulating system which includes a power source, a variable speed drive and a transducer, the combination of: a speed sensing modulator driven through said variable speed drive by said power source and said modulator providing a signal to said transducer whose output is connected to regulate the speed of said drive; said modulator including a magnetizable rotor driven by the output from said variable speed drive, and a magnetizable stator, each made of low remanence magnetic material and each being provided with a set of circumferential magnetic discontinuities which sets are spaced apart by a small airgap so as to establish a variable magnetic path through said stator, rotor and airgap; a modulator winding interlinking said magnetic path; a transformer having a primary and a secondary winding and said primary winding being serially connected to the modulator winding; a direct current source connected to energize said modulator and primary windings in series whereby upon rotation of said rotor by said variable speed drive undulations of direct current are produced in said modulator and primary windings and an alternating voltage is produced across said secondary transformer winding; means rectifying the alternating voltage and comparing it against a reference signal, and the difference signal between said reference signal and rectified alternating voltage being connected as input signal to said transducer to produce a speed responsive output therefrom to said variable speed drive.

7. In a speed regulating system which includes a power source, a variable speed drive and a transducer, the combination of: a speed sensing modulator driven through said variable speed drive by said power source and said modulator providing a signal to said transducer whose output is connected to regulate the speed of said drive; said modulator including a magnetizable rotor driven by the output from said variable speed drive, and a magnetizable stator, each made of low remanence magnetic material and each being provided with a set of circumferential magnetic discontinuities which sets are spaced apart by a small airgap so as to establish a variable magnetic path through said stator, rotor and airgap; a modulator winding interlinking said magnetic path; an inductive impedance connected in series with said modulator winding; a transformer having a primary and a secondary winding and the primary winding being connected in series with a bypass capacitor across said modulator winding; a direct current source connected to energize said serially connected modulator winding and impedance, whereby upon rotation of said rotor by said variable speed drive undulations of direct current are produced in said modulator winding and an alternating voltage is produced across said primary and secondary transformer winding; means rectifying the alternating voltage across said secondary winding and comparing it against a reference signal, and the difference signal between said reference signal and rectified alternating voltage being connected as input signal to said transducer to produce a speed responsive output therefrom to said variable speed drive.

8. In a speed regulating system which includes a power source, a variable speed drive and a transducer, the combination of: a speed sensing modulator driven through said variable speed drive by said power source and said modulator providing a signal to said transducer whose output is connected to regulate the speed of said drive; said modulator including a magnetizable rotor driven by the output from said variable speed drive, and a magnetizable stator, each made of low remanence magnetic material and each being provided with a set of circumferential magnetic discontinuities which sets are spaced apart by a small airgap so as to establish a variable magnetic path through said stator, rotor and airgap; a winding interlinking said magnetic path; a potentiometer connected to said winding; a direct current source connected to serially energize said potentiometer and winding; an inductor serially connected to said winding whereby upon a rotation of said rotor by said variable speed drive undulations of direct current are produced in said winding and an alternating voltage is produced across said inductor; means rectifying said alternating voltage and comparing it against a reference signal, derived from said potentiometer, and the difference signal between said reference signal and rectified alternating voltage being connected as input signal to said transducer to produce a speed responsive output therefrom to said variable speed drive.

9. In a speed regulating system which includes a power source, a variable speed drive and a transducer, the combination of: a speed sensing modulator driven through said variable speed drive by said power source and said modulator providing a signal to said transducer whose output is connected to regulate the speed of said drive; said modulator including a magnetizable rotor driven by the output from said variable speed drive, and a magnetizable stator, each made of low remanence magnetic material and each being provided with a set of circumferential magnetic discontinuities which sets are spaced apart by a small airgap so as to establish a variable magnetic path through said stator, rotor and airgap; a winding interlinking said magnetic path; a direct current source connected to energize said winding; a potentiometer connected across said direct current source for providing a reference signal; an inductor serially connected to said winding whereby upon rotation of said rotor by said variable speed drive undulations of direct current are produced in said winding and an alternating voltage is produced across said inductor; means rectifying said alternating voltage and comparing it against the reference signal, and the difference signal between said reference signal and rectified alternating voltage being connected as input signal to said transducer to produce a speed responsive output therefrom to said variable speed drive.

References Cited in the file of this patent
UNITED STATES PATENTS

| | | |
|---|---|---|
| 1,788,734 | Morton | Jan. 13, 1931 |
| 2,277,284 | Winther | Mar. 24, 1942 |
| 2,448,793 | Glass | Sept. 7, 1948 |
| 2,449,779 | Jaeschke | Sept. 21, 1948 |
| 2,523,046 | Montgomery | Sept. 19, 1950 |
| 2,734,161 | Fryklund | Feb. 7, 1956 |